(12) United States Patent
Millet et al.

(10) Patent No.: US 6,270,557 B1
(45) Date of Patent: *Aug. 7, 2001

(54) PROCESS FOR PURIFYING AIR BY ADSORPTION BEFORE CRYOGENIC DISTILLATION

(75) Inventors: Cyrille Millet; Philippe Bourgeois; Georges Kraus, all of Paris; Jean-Pierre Gabillard, Auffargis, all of (FR)

(73) Assignee: L'Air Liquide, Societe Anonyme pour l'Etude et l'Exploitation des Procedes Georges Claude, Paris Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,846

(22) Filed: Dec. 29, 1998

(30) Foreign Application Priority Data

Jan. 14, 1998 (FR) .................................................. 98 00303

(51) Int. Cl.⁷ ............................. B01D 53/47; B01D 53/26
(52) U.S. Cl. .................................. 95/96; 95/120; 95/139; 95/144; 95/902
(58) Field of Search ......................... 95/96–98, 117–121, 95/126, 139, 144, 902

(56) References Cited

U.S. PATENT DOCUMENTS

| | | | |
|---|---|---|---|
| 3,078,639 | * | 2/1963 | Milton .................................... 95/139 |
| 3,078,644 | * | 2/1963 | Milton .................................... 95/144 |
| 4,249,915 | * | 2/1981 | Sircar et al. ........................ 95/139 X |
| 4,477,267 | * | 10/1984 | Reiss ...................................... 95/139 |
| 4,775,396 | * | 10/1988 | Rastelli et al. ..................... 95/139 X |
| 4,935,580 | * | 6/1990 | Chao et al. ............................. 95/139 |
| 5,156,657 | * | 10/1992 | Jain et al. ........................... 95/139 X |
| 5,258,058 | * | 11/1993 | Coe et al. ................................. 95/95 |
| 5,454,857 | * | 10/1995 | Chao ................................... 95/902 X |
| 5,531,808 | * | 7/1996 | Oji et al. ............................ 95/139 X |
| 5,551,257 | * | 9/1996 | Jain ..................................... 95/126 X |
| 5,560,763 | * | 10/1996 | Kumar ................................. 95/139 X |
| 5,587,003 | * | 12/1996 | Bülow et al. ......................... 95/139 |
| 5,855,650 | * | 1/1999 | Kalbassi et al. ....................... 95/139 |
| 5,906,675 | * | 5/1999 | Jain et al. .............................. 95/139 |
| 5,938,819 | * | 8/1999 | Seery ..................................... 95/139 |
| 5,980,611 | * | 11/1999 | Kumar et al. ......................... 95/139 |

FOREIGN PATENT DOCUMENTS

| | | | |
|---|---|---|---|
| 0 667 183 | * | 5/1995 | (EP) . |
| 0 718 024 | * | 6/1996 | (EP) . |
| 1 551 348 | * | 8/1979 | (GB) . |
| 1 589 213 | * | 5/1981 | (GB) . |

* cited by examiner

*Primary Examiner*—Robert H. Spitzer
(74) *Attorney, Agent, or Firm*—Young & Thompson

(57) ABSTRACT

Process for separating at least carbon dioxide ($CO_2$) contained in a gas stream, preferably air, in which at least carbon dioxide is adsorbed on a zeolite-X having a Si/Al ratio of approximately 1 to 1.5 and containing at most 35% of $K^+$ cations, between 1 and 99% of $Na^+$ cations and at most 99% of $Ca^{2+}$ cations. This process is carried out at a temperature ranging from −40° C. to +80° C. Optionally, impurities chosen from water vapour and hydrocarbons, particularly ethylene, are also removed. The air thus purified is then capable of being cryogenically distilled.

15 Claims, 3 Drawing Sheets

PROCESS FOR PURIFYING AIR BY ADSORPTION BEFORE CRYOGENIC DISTILLATION

FIELD OF THE INVENTION

The present invention relates to a process for removing carbon dioxide contained in a gas stream and, more particularly to a process for purifying air of its carbon dioxide, and optionally water vapour and hydrocarbon, impurities before cryogenic distillation of the air.

BACKGROUND OF THE INVENTION

Before certain gases can be used in an industrial process, they must firstly be stripped of the impurities that they contain.

Thus, atmospheric air, which contains approximately 250 ppm to 500 ppm of carbon dioxide ($CO_2$) and a variable amount of water vapour and hydrocarbons, must be stripped of the $CO_2$ and optionally $H_2O$ and hydrocarbon impurities prior to any operation of cryogenically separating the air, especially by cryogenic distillation.

This is because, in the absence of such a pretreatment of the air, the $CO_2$ and optionally $H_2O$ and hydrocarbon impurities which are in it would solidify at low temperature, and the distillation columns would then become blocked, leading, on the one hand, to possible damage of the equipment and, on the other hand, to incorrect separation of the various constituents of air, such as nitrogen or oxygen.

Furthermore, the hydrocarbons likely to be present in the atmospheric air may, in some cases, build up in the liquid oxygen in the cold box and, for obvious safety reasons, it is then necessary to reduce their concentration in the liquid oxygen to as low a level as possible so as thus to prevent any damage of the plant.

A first technique for removing the $CO_2$ and $H_2O$ impurities contained in a gas stream, such as air, consists in refrigerating these impurities, that is to say in solidifying or crystallizing the impurities at low temperatures.

However, this technique is very costly in terms of both energy and equipment.

An alternative to this technique is to remove the carbon dioxide, and optionally the water, contained in the gas stream to be treated by adsorbing the impurities on a suitable adsorbent.

Zeolite-type materials are the adsorbents most commonly used in adsorption processes for gas separation.

Thus, document U.S. Pat. No. 3,885,927 describes the use of a zeolite-X at least 90% exchanged by barium cations, which zeolite has a $CO_2$ adsorption capacity approximately 40% greater than a zeolite-X containing only sodium cations.

Furthermore, document EP-A-0,284,850 describes a process for purifying a gas stream by adsorption over a Faujasite-type zeolite whose Si/Al ratio ranges from 1 to 2.5, which Faujasite is at least 90% exchanged by divalent cations, such as strontium or barium cations.

Moreover, document U.S. Pat. No. 4,775,396 describes the preferential adsorption of carbon dioxide contained in a non-acid gas, such as nitrogen, hydrogen and methane, by a PSA (Pressure Swing Adsorption) process over a fixed adsorption bed containing a Faujasite-type zeolite at least 20% exchanged by cations of the group formed by zinc, rare earths, hydrogen and ammonium and at most 80% exchanged by alkali metal or alkaline-earth metal cations.

As regards document FR-2,335,258, this describes a process for purifying gas mixtures comprising nitrogen, hydrogen, argon and/or oxygen, and containing carbon monoxide, carbon dioxide and water impurities, by adsorption of the impurities over A-type or X-type zeolites at a temperature of between −40 and +4° C.

That document describes A-type zeolites which are 70 to 82% exchanged by calcium ions and which have a Si/Al ratio of at most 1, and exchanged or unexchanged X-type zeolites which have a Si/Al ratio of between 1.15 and 1.5.

Conventionally, X-type zeolites whose Si/Al ratio is less than 1.15 are called LSX (Low Silica X-zeolites) or silica-depleted zeolites.

Likewise, document EP-A-0,718,024 describes the removal of $CO_2$ contained in a gas stream by adsorption of the $CO_2$ over a zeolite-X whose Si/Al ratio is at most approximately 1.15 at a temperature of between −50° and +80° C. approximately. That document furthermore describes results obtained by using X- or LSX-type zeolites, which are unexchanged or exchanged with lithium and calcium or rare-earth cations.

Moreover, mention may also be made of document EP-A-0,667,183 which describes the use of X-type zeolites containing from 50 to 95% of lithium cations, from 4 to 50% of aluminum, cerium, lanthanum or mixed-lanthanide cations, and from 0 to 15% of other cations.

Furthermore, documents GB-A-1,589,213, U.S. Pat. No. 5,258,058 and GB-A-1,551,348 also exist which describe processes for purifying gas mixtures by means of various exchanged or unexchanged zeolites.

SUMMARY OF THE INVENTION

The object of the present invention is to improve the conventional processes aiming to remove $CO_2$, and optionally water and hydrocarbons, especially ethylene for example, contained in a gas stream, particularly in a stream of air which has to undergo a subsequent cryogenic separation step, so as to make it possible to reduce the volume of adsorbers and therefore the amount of adsorbent to be used, to decrease the head losses of the adsorbent bed or beds, to reduce the adsorbent regeneration time and/or to reduce costs.

In fact, to put an effective stop on several impurities contained in a stream of air to be purified requires using an adsorbent whose adsorption properties are judicially chosen and whose cost is economically acceptable for a given industrial unit.

The present invention therefore relates to a process for separating at least carbon dioxide ($CO_2$) contained in a gas stream, in which at least carbon dioxide is adsorbed over a zeolite-X having a Si/Al ratio ranging approximately from 1 to 1.5 approximately and containing at most 35% of $K^+$ cations, between 1 and 99% of $Na^+$ cations and from 1 to 99% of $Ca^{2+}$ cations.

According to another aspect, the invention also relates to a process for separating at least carbon dioxide ($CO_2$) contained in a gas stream, in which at least carbon dioxide is adsorbed over a zeolite-X having a Si/Al ratio ranging approximately from 1 to 1.5 and containing from 0.01% to 35% of $K^+$ cations, between 1 and 99% of $Na^+$ cations and at most 99% of $Ca^{2+}$ cations.

Depending on the case, the process of the invention may comprise one or more of the following characteristics:

the zeolite has a Si/Al ratio ranging approximately from 1 to 1.15, preferably from 1 to 1.10, and preferably of about 1;

the zeolite contains from 0.01% to 25% of K$^+$ cations, and preferably less than 12% of K$^+$ cations;

the zeolite contains at least 50% of Ca$^{2+}$ cations, preferably at least 66% of Ca$^{2+}$ cations and preferably from 80 to 96% of Ca$^{2+}$ cations;

the zeolite contains from 82 to 92% of Ca$^{2+}$ cations, from 0 to 7% of K$^+$ cations, and/or from 4 to 11% of Na$^+$ cations;

the zeolite furthermore contains at least one other cation chosen from among lithium, barium, strontium, zinc, copper, silver, magnesium, gallium and germanium cations;

the adsorption is carried out in at least one adsorber and, preferably, in at least two adsorbers, preferably two adsorbers operating in parallel;

it is carried out at a temperature ranging from −40° C. to +80° C. and preferably from 0° to 60° C.;

it is chosen from the group formed by the TSA and PSA processes, and is preferably a TSA process;

it is carried out at an adsorption pressure ranging from $10^5$ to $10^7$ Pa and preferably from $3×10^5$ to $6×10^6$ Pa;

it comprises at least one step of regenerating the adsorbent;

the gas stream to be purified is air. In the context of the present invention "air" should be understood to mean the outside atmospheric ambient air or the air captured inside a building or an enclosure, which may or may not be heated, which ambient air may optionally undergo a pretreatment, such as an oxidative catalysis or an at least partial prior desiccation, or a modification of its content of one or more of its constituents, such as, especially, the addition or removal of oxygen or of nitrogen, for example;

it comprises at least one step of removing at least one impurity chosen from the group formed by water vapour and hydrocarbons, particularly ethylene;

it comprises at least one step of cryogenically separating at least part of the purified air, preferably a step of cryogenically distilling the purified air with recovery of the nitrogen, argon and/or oxygen.

DETAILED DESCRIPTION OF THE INVENTION

Figure 1:
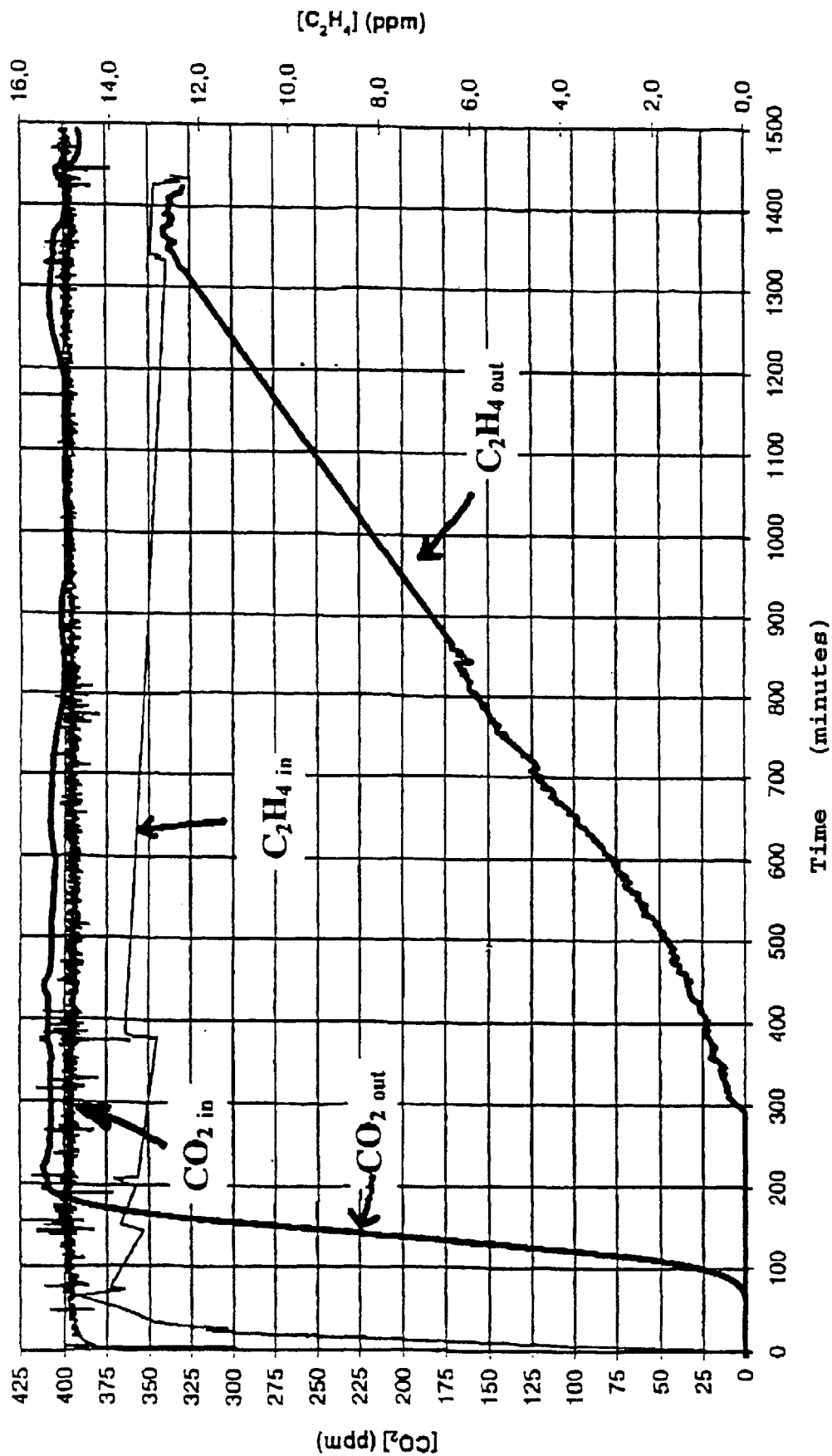
FIG. 1 depicts graphical representations of the amounts of CO$_2$ and C$_2$H$_4$ adsorbed over time on zeolites according to the invention.

The invention will now be described in greater detail with the aid of examples given by way of illustration but entailing no limitation.

EXAMPLE 1

Synthesis of the LSX Zeolite

The synthesis of a zeolite-X of Faujasite structure having a Si/Al ratio of less than or equal to 1.15, also called an LSX zeolite, is produced in a conventional manner, such as the one described, for example, in document GB-A-1,580,928.

The LSX zeolite obtained contains from 10 to 40% of potassium cations, generally from 20 to 30%, and from 60 to 90% of sodium cations; however, the optional presence of other cations should not be excluded.

An LSX zeolite containing both sodium and potassium ions is usually called an NaKLSX zeolite.

Starting from an NaKLSX zeolite thus synthesized, it is possible to vary the content of the latter in terms of its potassium and/or sodium cations by a conventional ion-exchange process.

For example, in order to increase the amount of sodium cations in the LSX zeolite obtained using the above-mentioned process, an ion-exchange process is then carried out so as to remove at least some of the potassium cations that it contains—these being replaced by sodium cations.

Thus, starting from an NaKLSX containing, for example, 30% of K$^+$ ions and 70% of Na$^+$ ions, it is possible to obtain an NaKLSX containing 10% of K$^+$ ions and 90% of Na$^+$ ions by treating the starting NaKLSX zeolite with, for example, a solution of sodium chloride.

Likewise, in order to incorporate cations of one or more other metals, such as calcium cations, into an NaKLSX, an ion-exchange process is then carried out so as to substitute at least some of the potassium and/or sodium cations contained in the starting NaKLSX with calcium cations so as to obtain the predetermined levels of exchange. Thus, as previously, starting from an NaKLSX, a CaNaKLSX is obtained, that is to say an NaKLSX which also contains calcium ions, by introducing the calcium ions into it by K$^+$ and/or Na$^+$ cation substitution.

In fact, as we will see later, the various types of cations contained in an LSX zeolite and their respective proportions (levels of exchange) have a considerable influence on, in particular, the CO$_2$ adsorption capacity and/or on the ethylene adsorption capacity of the zeolite when the latter is employed in a PSA- or TSA-type process intended for removing CO$_2$ contained in a gas stream, such as air.

EXAMPLE 2

Nitrogen artificially contaminated with 400 ppm of CO$_2$ is brought into contact with zeolite particles at a pressure of $6×10^5$ Pa, at a temperature of 25° C. and with a flow rate of 2.4 NM$^3$/h in a 30 mm diameter laboratory adsorber.

A first test is carried out using an NaKLSX-type zeolite containing approximately less than 10% of K$^+$ cations, the remaining cations being Na$^+$ cations.

A second test is carried out using a conventional 13X-type zeolite having a Si/Al ratio of greater than 1.25 and essentially containing sodium cations.

After comparing the results, it turns out that an LSX zeolite used as in Test 1 makes it possible to achieve an approximately 43% increase in adsorption performance compared with a conventional 13X-type zeolite used as in the second test.

This is because, when an NaKLSX zeolite is used, the CO$_2$ breakthrough time is approximately 172 minutes whereas with a 13X-zeolite there is CO$_2$ breakthrough at the end of only 120 minutes; the term "breakthrough time" refers to the time between the start of the adsorption operation and the appearance of CO$_2$ downstream of the bed of adsorbent.

This comparative example demonstrates the superiority of an NaKLSX-type zeolite over a conventional zeolite.

EXAMPLE 3

In a similar manner to Example 2, a stream of air containing approximately 350 ppm of $CO_2$ is brought into contact, on the one hand, with an NaKLSX zeolite according to the invention and, on the other hand, with a conventional 13X-zeolite.

The results obtained are similar to those in Example 2.

EXAMPLE 4

Apart from $CO_2$, the atmospheric air contains other impurities which it is necessary to remove before carrying out a cryogenic distillation of the said air, namely, in particular, impurities of the water-vapour and/or ethylene ($C_2H_4$) type.

This is because ethylene is a hydrocarbon which is often found in atmospheric air on industrial production sites and which has the particular feature of being adsorbed with even greater difficulty than $CO_2$ over conventional adsorbents and for which, consequently, there is a risk of build-up and explosion in the case of cryogenic air-separation units.

The removal of water-vapour-type impurities may be achieved by adsorption either directly over the bed of LSX zeolite according to the invention or over a bed of desiccating particles placed upstream of the bed of LSX zeolite, for example a bed of zeolite or alumina or silica gel.

In a similar manner, the removal of ethylene impurities liable to be found in the stream of air to be purified may be carried out either:

- directly over the bed of LSX zeolite of the invention, for example an LSX zeolite containing less than 50% of calcium cations, the rest of the cations being sodium and potassium cations; or
- over a bed of a conventional X-, LSX- or A-type zeolite preferably containing magnesium, calcium, strontium and/or barium cations, which bed is placed upstream of a bed of LSX zeolite according to the invention.

Figure 2:
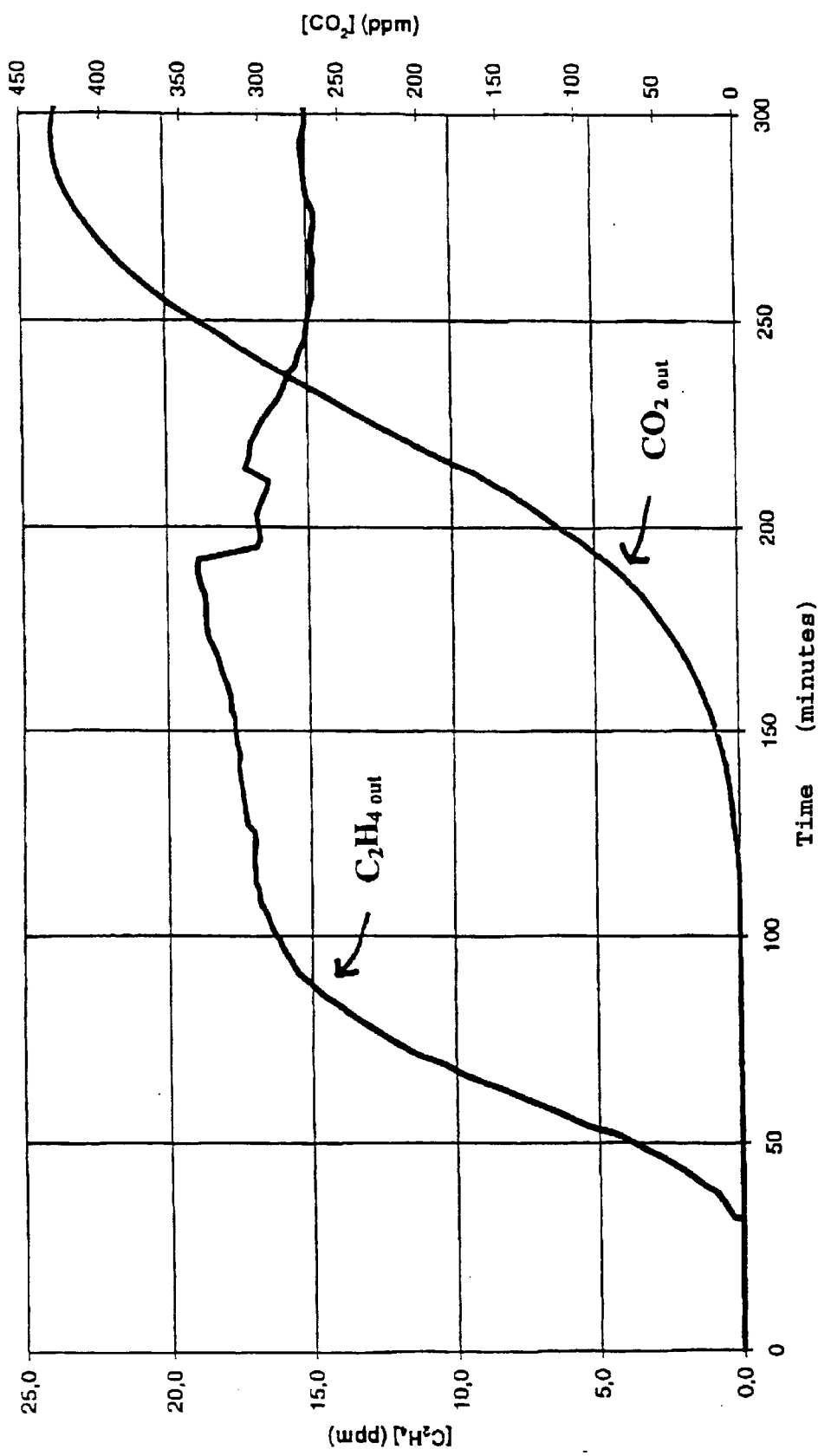
FIG. 2 is a graphical representation of the amounts of CO$_2$ and C$_2$H$_4$ adsorbed over time on an NaKLSX-type zeolite according to the invention.

Tests carried out on a stream of air containing 450 ppm of $CO_2$ and approximately 15 ppm of ethylene and under conditions similar to those in Example 3 have shown that although a single bed of CaNaKLSX zeolite 60% exchanged with calcium cations allows the $C_2H_4$ and $CO_2$ impurities to be stopped; it is possible to provide two beds of zeolites of different kinds in order to stop these two types of impurity, namely a first bed consisting, for example, of a 10X-zeolite 96% exchanged by calcium cations (FIG. 1) in order to stop mainly ethylene and a second bed, lying downstream, consisting of LSX zeolite according to the invention in order to stop mainly $CO_2$ (FIG. 2).

More specifically, FIG. 1 shows, plotted on the Y-axis, the amounts (in ppm) of $CO_2$ and of $C_2H_4$ that are adsorbed over time (in minutes), plotted on the X-axis, over a zeolite-X 96% exchanged with $Ca^{2+}$ ions, the other ions being essentially $Na^+$ and/or $K^+$ ions (an NaKCaLSX, an NaCaLSX or a KCaLSX zeolite according to the invention).

Likewise, FIG. 2 shows diagrammatically the amounts (in ppm) of $CO_2$ and $C_2H_4$ which are adsorbed over time (in minutes) over an NaKLSX-type zeolite according to the invention.

Figure 3:
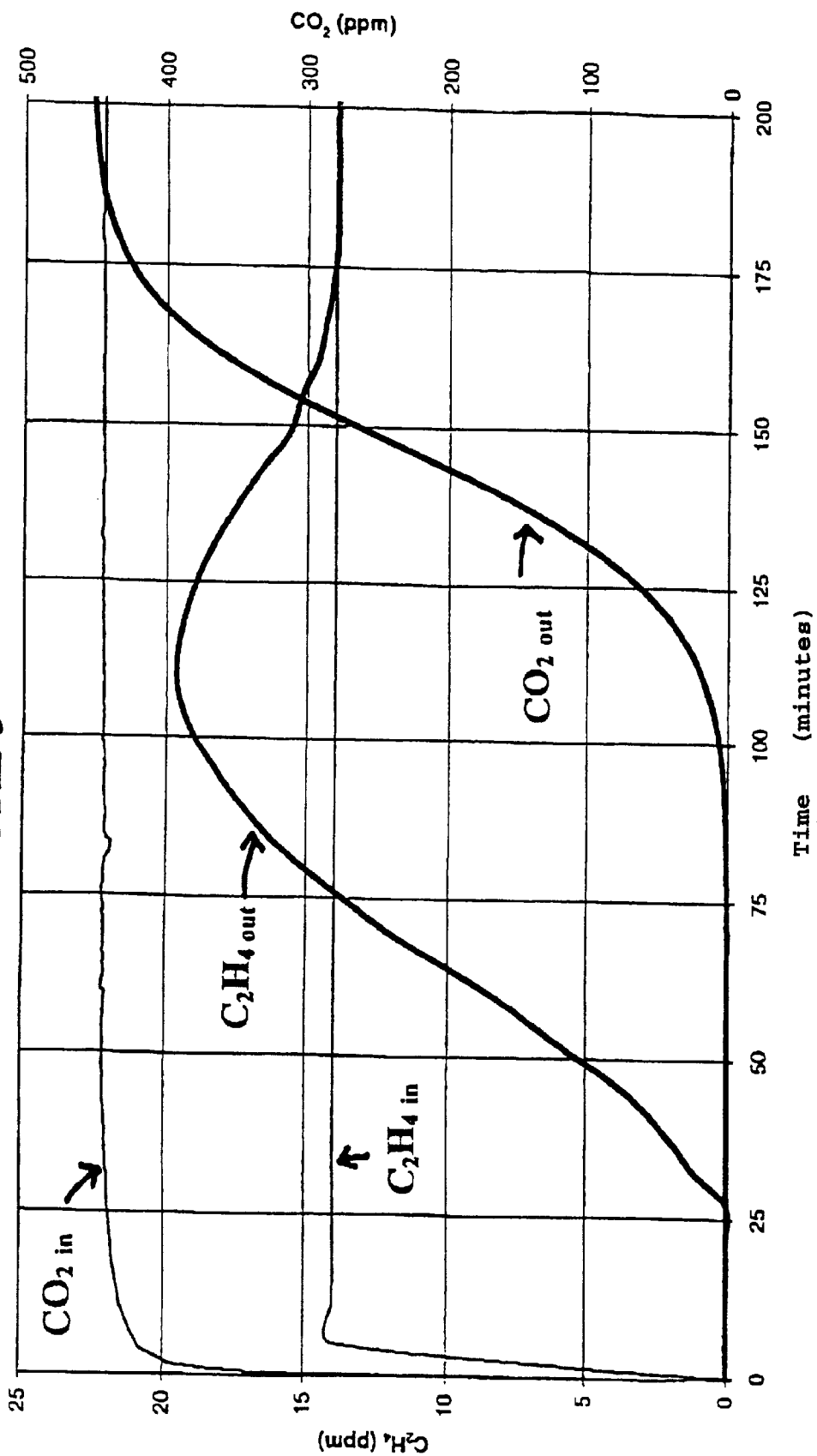
FIG. 3 is a graphical representation of the amounts of CO$_2$ and C$_2$H$_4$ adsorbed over time on a conventional 13X-type zeolite.

By way of comparison, as regards FIG. 3, this shows the amounts of $CO_2$ and $C_2H_4$ which are adsorbed over time (in minutes) over a conventional 13X-type zeolite, according to the invention.

It should be noted in the curves of FIGS. 1 to 3 that "$C_2H_4$ in" and "$CO_2$ in" denote the respective amounts of $C_2H_4$ and $CO_2$ entering the purification zone, that is to say before purification, and "$C_2H_4$ out" and "$CO_2$ out" denote the respective amounts of $C_2H_4$ and $CO_2$ leaving the purification zone, that is to say after purification.

Furthermore, the depth of the bed of adsorbent employed in the tests illustrated by FIGS. 1 to 3 is 80 cm, 35 cm and 20 cm, respectively.

It is particularly apparent from FIGS. 1 to 3 that, if a single bed of LSX zeolite is used to stop both $CO_2$ and ethylene, it is preferable to use a CaNaKLSX zeolite containing just the amount of calcium cations necessary and sufficient for $CO_2$ and ethylene break through at the same time, so as to reduce the manufacturing cost of the zeolite and consequently the costs of the air separation process, that is to say approximately 30 to 80% of calcium cations, the other cations being mainly potassium and/or sodium cations FIG. 2).

It is preferred to place a bed of desiccating particles, such as alumina particles, silica gel particles or zeolitic particles, upstream of the two aforementioned beds of adsorbents so as to remove any water vapour which may be in the gas stream to be purified, as mentioned above.

What is claimed is:

1. Process for separating at least water vapor, carbon dioxide ($CO_2$) and ethylene ($C_2H_4$) contained in an air stream, which comprises the sequential steps of:

removing water vapor from said air stream; and contacting said air stream with a zeolite-X having a Si/Al ratio ranging from 1 to 1.15, and containing at most 35% of $K^+$ cations, between about 4 and 99% of $Na^+$ cations and from 30% to 96% $Ca^{+2}$ cations, so as to adsorb at least carbon dioxide and ethylene and obtain a purified air.

2. The process according to claim 1, wherein the Si/Al ratio is about 1.

3. The process according to claim 1, wherein the zeolite contains from 0.01% to 25% of $K^+$ cations.

4. The process according to claim 3, wherein the zeolite contains less than 12% of $K^+$ cations.

5. The process according to claim 1, wherein the zeolite contains at least 50% of $Ca^{+2}$ cations.

6. The process according to claim 5, wherein the zeolite contains at least 66% of $Ca^{+2}$ cations.

7. The process according to claim 1, wherein the zeolite contains from 80% to 96% of $Ca^{+2}$ cations.

8. The process according to claim 1, wherein the zeolite contains from 82 to 92% of $Ca^{+2}$ cations, from 0 to 7% of $K^+$, and/or from 4% to 11% of $Na^+$ cations.

9. The process according to claim 1, wherein the process is selected from the group consisting of TSA and PSA processes.

10. The process according to claim 9, wherein the process is a PSA process.

11. The process according to claim 1, wherein the process is carried out at an adsorption pressure ranging from $10^5$ to $10^7$ Pa.

12. The process according to claim 1, wherein the process is carried out at a temperature ranging from $-40°$ C. to $+80°$ C.

13. The process according to claim 12, wherein the temperature ranges from $0°$ C. to $+60°$ C.

14. The process according to claim 1, further comprising at least one step of cryogenically separating at least part of the purified air.

15. Process for separating at least water vapor, carbon dioxide ($CO_2$) and ethylene ($C_2H_4$) contained in an air stream, which comprises the sequential steps of:

removing water vapor from said air stream; and contacting said air stream with a zeolite-X having a Si/Al ratio ranging from 1 to 1.15, and containing from 0.01% to 35% of $K^+$ cations, between about 4 and 99% of $Na^+$ cations and at most 96% of $Ca^{+2}$ cations so as to adsorb at least carbon dioxide and ethylene and obtain a purified air.

* * * * *